United States Patent
Ratnakar

(10) Patent No.: US 6,928,186 B2
(45) Date of Patent: Aug. 9, 2005

(54) SEMANTIC DOWNSCALING AND CROPPING (SEDOC) OF DIGITAL IMAGES

(75) Inventor: Viresh Ratnakar, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 541 days.

(21) Appl. No.: 10/177,010

(22) Filed: Jun. 21, 2002

(65) Prior Publication Data

US 2003/0234798 A1 Dec. 25, 2003

(51) Int. Cl.$^7$ ............................................... G06K 9/36
(52) U.S. Cl. ....................... 382/166; 382/298; 382/250; 382/299; 345/660; 345/472
(58) Field of Search ................. 382/162–168, 382/228, 239, 240, 248, 250, 289, 299, 300, 202, 203, 204; 345/660, 619, 505, 502, 564, 666, 472, 589; 348/452, 665, 663, 664, 669, 670; 358/525, 512, 518, 1.9, 2.1, 3.24

(56) References Cited

U.S. PATENT DOCUMENTS

| | | | |
|---|---|---|---|
| 5,623,310 A | * | 4/1997 | Kim ........................ 348/394.1 |
| 5,845,015 A | | 12/1998 | Martucci |
| 5,960,126 A | | 9/1999 | Nielsen et al. |
| 6,175,659 B1 | | 1/2001 | Huang |
| 6,263,119 B1 | | 7/2001 | Martucci |
| 6,311,328 B1 | | 10/2001 | Miyazaki et al. |
| 6,317,523 B1 | | 11/2001 | Miura et al. |
| 6,332,038 B1 | | 12/2001 | Funayama et al. |
| 6,348,929 B1 | * | 2/2002 | Acharya et al. ............ 345/660 |
| 6,825,857 B2 | * | 11/2004 | Harasimiuk ................. 345/660 |
| 2003/0099395 A1 | * | 5/2003 | Wang et al. ................. 382/165 |
| 2003/0161541 A1 | * | 8/2003 | Ridge .......................... 382/245 |
| 2004/0047416 A1 | * | 3/2004 | Tomita ..................... 375/240.2 |

* cited by examiner

Primary Examiner—Kanjibhai Patel
Assistant Examiner—Ali Bayat
(74) Attorney, Agent, or Firm—Michael T. Gabrik

(57) ABSTRACT

A compressed-domain-based algorithm reduces a source image to a given target size using a combination of downscaling, cropping, and region-of-interest identification. The source image is partitioned into a plurality of macroblocks, each macroblock containing a plurality of chrominance and luminance blocks, each chrominance block and each luminance block containing a DC coefficient and AC coefficients. To each macroblock, a first rule is applied based on values of the DC coefficient of the chrominance blocks in that macroblock to identify a particular type of texture in the image. Also to each macroblock, a second rule is applied based on select values of the AC coefficient of luminance blocks in that macroblock to identify edges in the image. The macroblocks within the image are then searched to find an area containing an area of interest based on the results of applying the first and second rules.

32 Claims, 4 Drawing Sheets

Source Image

Downscaled Image

SEMANTIC DOWNSCALING AND CROPPING (SEDOC) OF DIGITAL IMAGES

BACKGROUND OF THE INVENTION

1. Field of the Invention

The present invention relates to an image processing algorithm that operates on a larger digital image to automatically obtain therefrom a smaller digital image containing the semantically "most significant" part of the image. The algorithm can be implemented in apparatuses, methods, and programs of instructions, e.g., software.

2. Description of the Related Art

Traditional resizing of a digital image is done by downscaling fully to the target size. The problem with that approach is it hard to discern any meaningful content in the downscaled image. Another approach would be to crop out a central part of the image. This, too, rarely gives acceptable results in "grabbing" the area of interest. Thus, while work has been done in the field of downscaling an image and also in identifying objects in an image, conventional techniques do not address the issue of reducing the area of an image by a combination of downscaling, cropping, and region-of-interest identification, all in the compressed domain.

OBJECTS AND SUMMARY OF THE INVENTION

Object of the Invention

It is therefore an object of the present invention to overcome the problems and shortcomings mentioned above.

It is a further object of this invention to reduce a source image to a given target size using a combination of downscaling and cropping, while retaining the semantically most relevant part of the image.

Summary of the Invention

According to one aspect of this invention, a method for reducing an image to a given target size is provided. The method comprises the steps of: (a) partitioning the image into a plurality of macroblocks, each macroblock containing a plurality of chrominance and luminance blocks, each chrominance block and each luminance block containing a first type of coefficient (e.g., a DC coefficient) and a plurality of second type of coefficients (e.g., AC coefficients); (b) to each macroblock, applying a first rule based on values of the first type of coefficient of the chrominance blocks in that macroblock to identify a particular type of texture in the image; (c) to each macroblock, applying a second rule based on select values of the second type of coefficient of luminance blocks in that macroblock to identify edges in the image; and (d) searching the macroblocks within the image to find an area containing an area of interest based on the results of applying the first and second rules in steps (b) and (c).

In a preferred embodiment, the plurality of chrominance blocks in each macroblock comprises a plurality of Cb chrominance blocks and a plurality of Cr chrominance blocks.

Preferably, step (b) comprises computing a first average value of the first type of coefficient of the Cb chrominance blocks, computing a second average value of the first type of coefficient of the Cr chrominance blocks, assigning a first score to each macroblock indicating the presence of the particular type of texture in that macroblock, if (i) the absolute values of the first and second average values are approximately equal, (ii) the first average value is less than zero, (iii) the second average value is greater than zero, and (iv) the second average value is less than a predetermined constant, and assigning a second score to each macroblock indicating the absence of the particular type of texture in that macroblock if all of the conditions (i) through (iv) are not satisfied.

Preferably, step (c) comprises adding to the first or second score an edge score.

Preferably, the first score is computed as the difference between the second and first average values multiplied by a preset constant, and the edge score is computed as the sum of the absolute value of each of selected coefficients of the second type of each luminance block in that macroblock.

Preferably, step (d) comprises searching the macroblocks within the image to find a section with the highest total score, and cropping out a portion of the image containing the section with the highest score.

According to another aspect, the method for reducing an image to a given target size, comprises the steps of: (a) partitioning the image into a plurality of macroblocks, each macroblock containing a plurality of Cb chrominance blocks, a plurality of Cr chrominance blocks, and a plurality of luminance blocks, each block containing a DC coefficient and a plurality of AC coefficients; (b) for each macroblock, computing an average DC value of the Cb chrominance blocks (DCb), computing an average DC value of the Cr chrominance blocks (DCr), and assigning a first score indicating the presence of the particular type of texture in that macroblock, if (i) the absolute values of DCb and DCr are approximately the equal, (ii) DCr is greater than zero, (iii) DCb is less than zero, and (iv) DCr is less than a predetermined constant, the first score being computed based on DCb, DCr and a preset constant, and assigning a second score to each macroblock indicating the absence of the particular type of texture in that macroblock if all of the conditions (i) through (iv) are not satisfied; (c) for each macroblock, adding to the first score or second score an edge score computed based on the absolute values of selected AC coefficients of each luminance block in that macroblock; and (d) searching the macroblocks within the image to find a section with the highest total score and cropping out a portion of the image containing the section with the highest score.

In another aspect, the invention involves an apparatus for reducing an image to a given target size. The apparatus comprises suitable components for carrying out the processing described above. Such components may include, for example, a CPU, one or more application specific integrated circuits (ASICs), digital signal processing circuitry, or the like.

In accordance with further aspects of the invention, the above-described method or any of the steps thereof may be embodied in a program of instructions (e.g., software) which may be stored on, or conveyed to, a computer or other processor-controlled device for execution. Alternatively, the method or any of the steps thereof may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A. Overview

The algorithm of the present invention (SEDOC) is a very effective "machine intelligence" technique and actually approaches the results that human intelligence would achieve most of the time in finding the semantically most significant part of an image. While it is difficult, if not impossible, to devise a method that would equal human intelligence in this regard, the present invention offers a good and practical automated solution to the problem. To achieve these results, SEDOC reduces the area of an image by a combination of downscaling, cropping, and region-of-interest identification, all in the frequency or compressed domain.

In the JPEG format, SEDOC uses information in the DC coefficients and the first few AC coefficients of each DCT block to analyze the image and determine the "most significant" part of it. The analysis assigns high scores to dominant edges and objects, and to skin-like textures.

B. SEDOC

SEDOC is designed to operate on a compressed image to provide a compressed or frequency domain solution. The details of SEDOC are described below in connection with a JPEG image, as that is the preferred embodiment. However, SEDOC is not limited to JPEG images. With some suitable alterations, which would be apparent to one skilled in the art in light of this disclosure, SEDOC may be applied to any image compression format using an orthogonal transform function.

Figure 1:
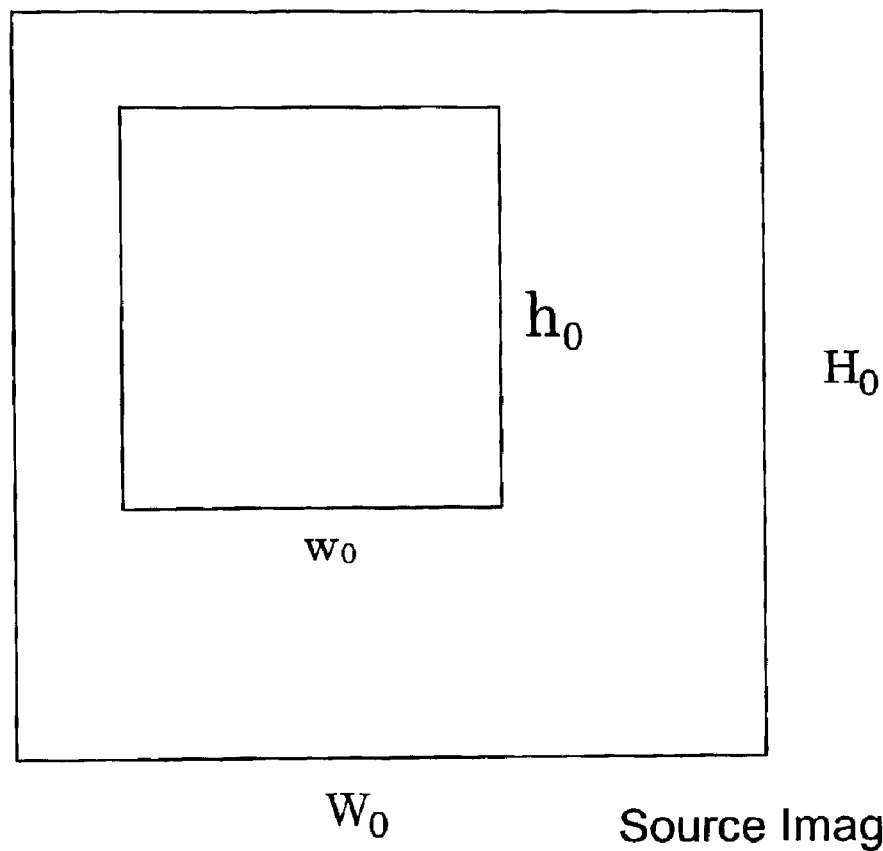
FIG. 1 is a schematic representation of a JPEG source image and a smaller JPEG image, within the source image, containing the semantically most relevant part of the source image.

In a preferred embodiment, as shown in FIG. 1, given a $W_0 \times H_0$ JPEG image, SEDOC operates to obtain a smaller $w_0 \times h_0$ JPEG image which contains the semantically most relevant part of the original image.

Let (w,h) denote the target dimensions extended to be multiples of the JPEG macrobock size (typically 16×16). Further, let $w_m$ and $h_m$ denote the target dimensions in macrobocks. Thus, $w_m$*macroblock-width=w and $h_m$*macroblock-height=h.

SEDOC obtains the target area by downscaling and cropping. The downscaling is done so that the subsequent cropping does not discard an inordinately large part of the original image. The inventor has found that downscaling up to twice the target size in each dimension gives the best results.

Figure 2:
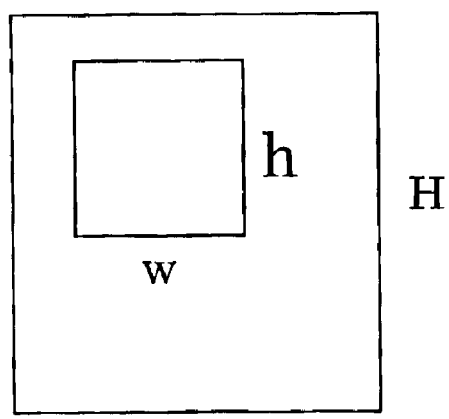
FIG. 2 is a schematic representation of the JPEG source image after it has been a downscaled and a target area within the downscaled image.

Let W, H denote the dimensions of the image after it has been downscaled such that target area (w×h) is about $\frac{1}{4}^{th}$ of (W×H), as shown in FIG. 2. Further, let W, H be multiples of the macrobock dimensions too, and let $W_m$, $H_m$ denote the width and height in macroblocks after the downscaling.

Note that the downscaling can be accomplished in the compressed domain by restricting the scale to be of the form $(s_1 * s_2)/64$, where $s_1$ and $s_2$ are integers in the range [1,8].

Thus, at this point the problem has been reduced to the following: Given a W×H JPEG image, obtain by cropping the semantically most relevant w×h piece of it as a JPEG image. W, H, w, h are all multiples of macroblock dimensions. The corresponding macroblock count for each dimension is denoted by attaching the suffix "$_m$".

The SEDOC algorithm attaches high scores to dominant edges and to skin-like textures. It crops out as its output that part of the image which has the highest score. Most of the steps below were devised after careful experiments so that SEDOC would perform well over a wide range of images. As such, many of the constants are heuristic, mainly indicative of a preferred embodiment.

Figure 3:
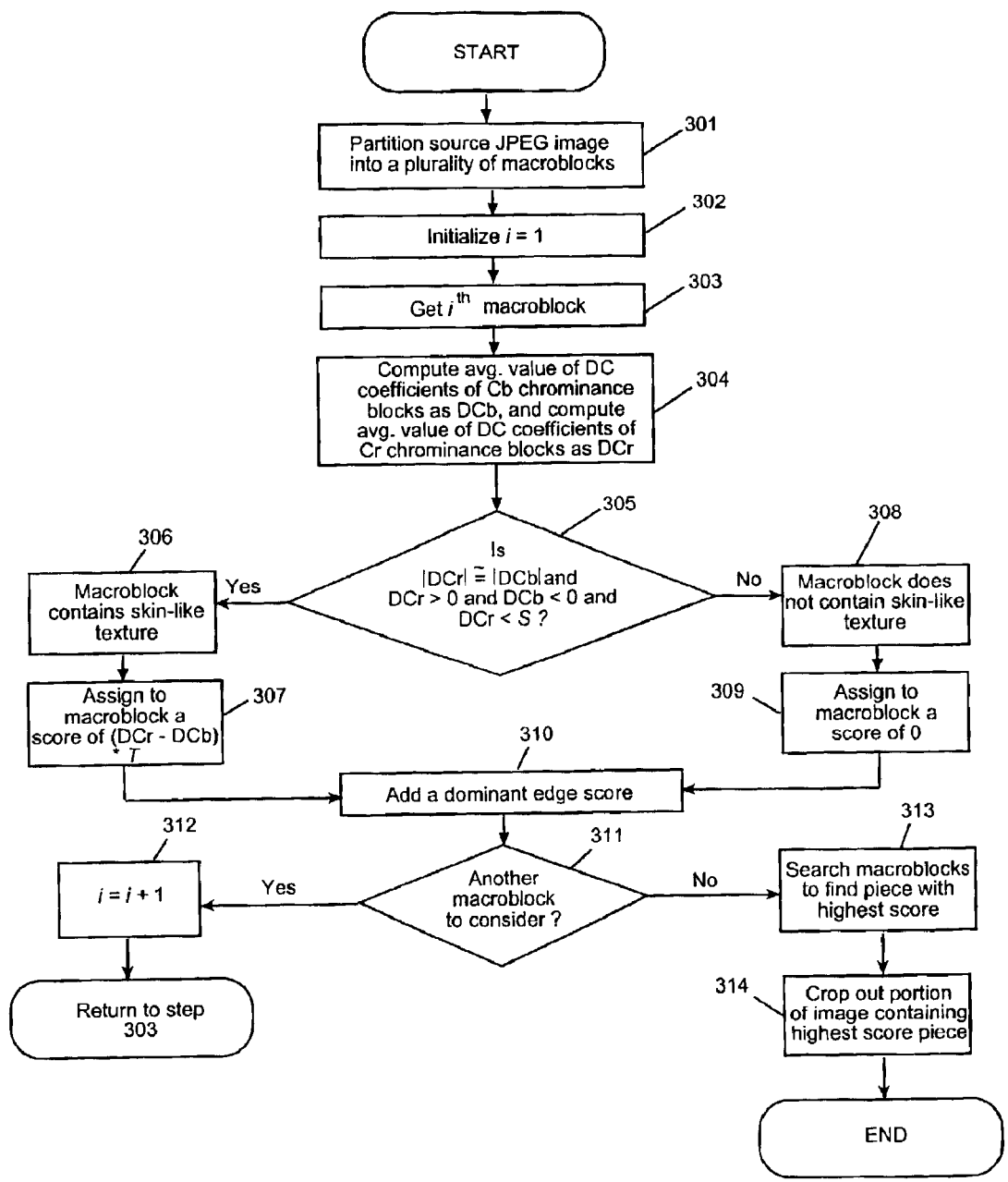
FIG. 3 is a flow chart of the algorithm according to embodiments of the invention.

The flow chart of FIG. 3 illustrates, by way of example, the SEDOC algorithm in accordance with embodiments of the invention.

First, in step 301, the source JPEG image is partitioned into a plurality of macroblocks, each of which is made up of one or more Cb chrominance blocks, one or more Cr chrominance blocks, and one or more luminance (Y) blocks. In a preferred embodiment, in which JPEG is the compression format, each of these Cb, Cr and Y blocks is comprised of a DC coefficient and a plurality of AC coefficients. It should be noted that the values of all coefficients represent dequantized coefficient values.

Next, the algorithm assigns a score to each macroblock in the image. Thus, in step 302, a macroblock counting variable i is initialized to 1. In step 303, the $i^{th}$ macroblock is obtained. For this macroblock, the average value of the DC coefficient terms of the Cb chrominance blocks is computed as DCb, and the average value of the DC coefficient terms of the Cr chrominance blocks is computed as DCr (step 304).

In step 305, determinations are made concerning the averages computed in step 304. If |DCr| is approximately equal to |DCb| and DCr>0 and DCb<0 and DCr<S, then that indicates skin-like texture (step 306). If the macroblock passes the tests in step 305, the algorithm assigns it a score of (DCr−DCb)*T (step 307). If any of these tests fail, it is concluded that this macroblock does not contain skin-like texture (step 308), and a score of zero is assigned (step 309).

Here S is a constant to rule out very bright pale textures (such as pink/yellow walls). In a preferred embodiment S=60, but other values between about 40 and about 80 may also be used. T is another constant. In a preferred embodiment, T=10, but other values between about 5 and about 15 may also be used.

To the score obtained in step 307 or 309, a "dominant edge" score is added in step 310. This is done by simply taking the absolute values of the $(0,1)^{th}$ and $(1,0)^{th}$ AC coefficients in each of the luminance (Y) blocks of the macroblock and adding all of those values together. Note that the constant T in step 307 is for assigning the skin-score a relative weight with respect to the edge score.

Next, it is determined in step 311 whether or not all of the macroblocks have been analyzed. If not, the macroblock counter i is incremented in step 312 and the algorithm returns to step 303 to obtain the next macroblock.

After all of the macroblocks have been analyzed and assigned a score, the algorithm finds the best area in the image. To do this, the algorithm searches over all macroblock-aligned $(w_m/k)$ by $(h_m/k)$ pieces (dimensions given here in terms of macroblocks) to find the piece with the highest score (step 313). The score is not maximized over the target area; rather, it is maximized over a smaller area. Here k is another constant; in a preferred embodiment, k=2, but other values between about 1 and about 4 may also be used. This has the desirable effect of creating a result image which also captures some context. Having found the piece with the highest score, the algorithm crops out as the result a larger ($w_m \times h_m$, in terms of macroblocks) piece which contains this piece at roughly its center (step 314). The algorithm then terminates.

Note that basic steps of assigning a score to each macroblock and finding the best area can be carried out in a pipelined fashion, using a buffer of height $h_m/k$ and width $W_m$, where each buffer entry is the score of a macroblock. Also, advantageously, the score computation is done entirely in the compressed domain and can be efficiently done without even de-zigzagging the coefficients.

C. Implementations

Figure 4:
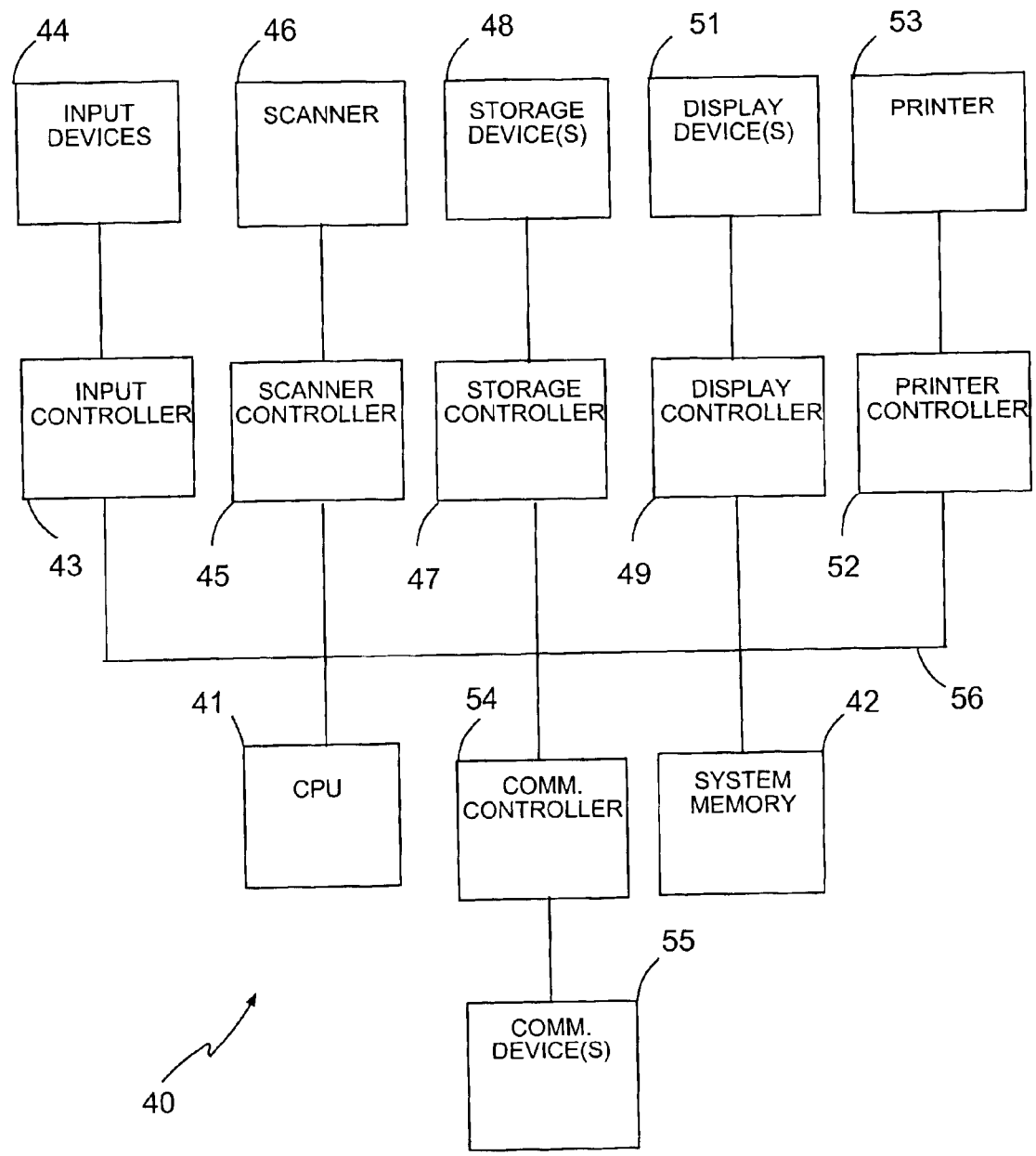
FIG. 4 is a block diagram of an exemplary image processing system which may be used to implement the algorithm of the present invention.

The algorithm of the present invention may be conveniently implemented in software which may be run on an image processing system 40 of the type illustrated in FIG. 4. As illustrated in FIG. 4, the system includes a central processing unit (CPU) 41 that provides computing resources and controls the computer. CPU 41 may be implemented with a microprocessor or the like, and may also include a graphics processor and/or a floating point coprocessor for mathematical computations. System 40 further includes system memory 42 which may be in the form of random-access memory (RAM) and read-only memory (ROM).

A number of controllers and peripheral devices are also provided, as shown in FIG. 4. Input controller 43 represents an interface to one or more input devices 44, such as a keyboard, mouse or stylus. There is also a controller 45 which communicates with a scanner 46 or equivalent device for digitizing documents including images to be processed in accordance with the invention. A storage controller 47 interfaces with one or more storage devices 48 each of which includes a storage medium such as magnetic tape or disk, or an optical medium that may be used to record programs of instructions for operating systems, utilities and applications which may include embodiments of programs that implement various aspects of the present invention. Storage device(s) 48 may also be used to store data to be processed in accordance with the invention. A display controller 49 provides an interface to a display device 51 which may be a cathode ray tube (CRT), thin film transistor (TFT) display or video player. A printer controller 52 is also provided for communicating with a printer 53 for printing documents including images processed in accordance with the invention. A communications controller 54 interfaces with a communication device 55 which enables system 40 to connect to remote devices through any of a variety of networks including the Internet, a local area network (LAN), a wide area network (WAN), or through any suitable electromagnetic carrier signals including infrared signals.

In the illustrated system, all major system components connect to bus 56 which may represent more than one physical bus.

Depending on the particular application of the invention, various system components may or may not be in physical proximity to one another. For example, the input data (e.g., the input image to which SEDOC is to be applied) and/or the output data (e.g., the output image to which SEDOC has been applied) may be remotely transmitted from one physical location to another. Also, a program that implement various aspects of this invention may be accessed from a remote location (e.g., a server) over a network. Such data and/or program may be conveyed through any of a variety of machine-readable medium including magnetic tape or disk or optical disc, network signals, or any other suitable electromagnetic carrier signals including infrared signals.

Figure 5:
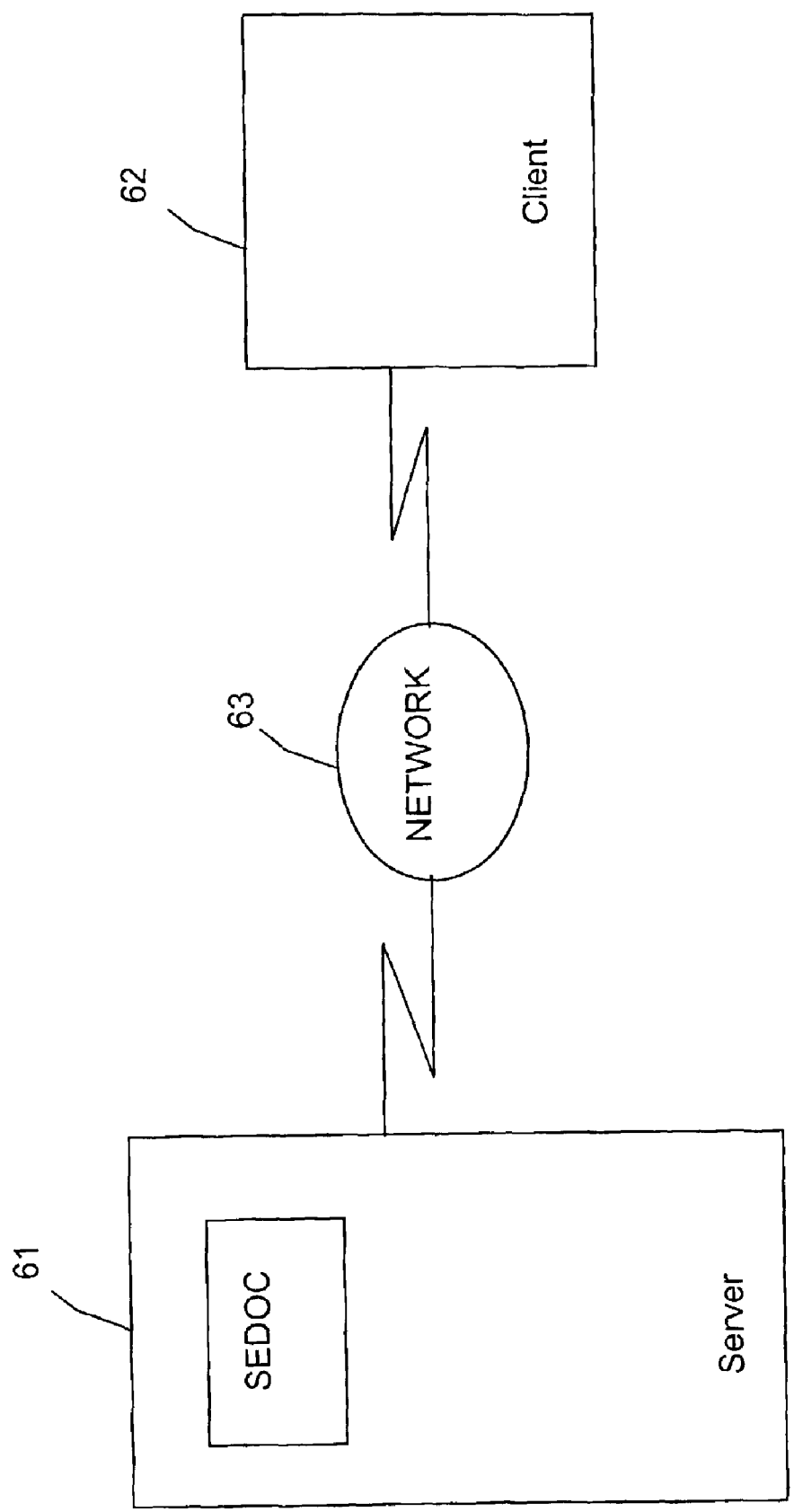
FIG. 5 is a schematic representation of a client-server system representing one application of the invention.

As shown in FIG. 5, one application of the invention involves a client-server system, where images are transferred from a server 61 to a client 62 over a network 63, SEDOC may be run on the server side to save network bandwidth. This is particularly advantageous when the image(s) to be transferred are large and the client 62 is a hand-held device with a relatively small display, such as a cell phone, personal digital assistant (PDA), or the like.

While the present invention may be conveniently implemented with software, a hardware implementation or combined hardware/software implementation is also possible. A hardware implementation may be realized, for example, using ASIC(s), digital signal processing circuitry, or the like. As such, the claim language "machine-readable medium" further includes hardware having a program of instructions hardwired thereon. Also, the "means" language used in the claims covers appropriately configured processing devices, such as CPUs, ASICs, digital processing circuitry, or the like.

With these implementation alternatives in mind, it is to be understood that the figures and accompanying description provide the functional information one skilled in the art would require to write program code (i.e., software) or to fabricate circuits (i.e., hardware) to perform the processing required.

D. Effects

As the foregoing description demonstrates, the present invention provides an efficient and effective algorithm for reducing a source image to a given target size using a combination of downscaling and cropping, while retaining the semantically most relevant part of the image. SEDOC also offers numerous advantages. One is that SEDOC works in the compressed domain, operating efficiently on transform (e.g., DCT) coefficients in compressed (e.g., JPEG) images without de-zigzagging them. SEDOC uses compressed-domain processing to perform the actual downscaling and cropping. Also, SEDOC uses one formula based on the DC values of chrominance components of image blocks to identify and assign high scores to skin-like textures, and uses another formula based on a very few AC values of luminance components of image blocks to identify and assign high scores to dominant edges. Still another advantage is that SEDOC works without human assistance.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for reducing an image to a given target size, comprising the steps of:

(a) partitioning the image into a plurality of macroblocks, each macroblock containing a plurality of chrominance and luminance blocks, each chrominance block and each luminance block containing a first type of coefficient and a plurality of second type of coefficients;

(b) to each macroblock, applying a first rule based on values of the first type of coefficient of the chrominance blocks in that macroblock to identify a particular type of texture in the image;

(c) to each macroblock, applying a second rule based on select values of the second type of coefficient of luminance blocks in that macroblock to identify edges in the image; and (d) searching the macroblocks within the image to find an area containing an area of interest based on the results of applying the first and second rules in steps (b) and (c).

2. The method of claim 1, wherein the plurality of chrominance blocks in each macroblock comprises a plurality of Cb chrominance blocks and a plurality of Cr chrominance blocks.

3. The method of claim 2, wherein step (b) comprises computing a first average value of the first type of coefficient of the Cb chrominance blocks and computing a second average value of the first type of coefficient of the Cr chrominance blocks.

4. The method of claim 3, wherein step (b) further comprises assigning a first score to each macroblock indicating the presence of the particular type of texture in that macroblock, if (i) the absolute values of the first and second average values are approximately equal, (ii) the first average value is less than zero, (iii) the second average value is greater than zero, and (iv) the second average value is less than a predetermined constant, and assigning a second score to each macroblock indicating the absence of the particular type of texture in that macroblock if all of the conditions (i) through (iv) are not satisfied.

5. The method of claim 4, where step (c) comprises adding to the first or second score an edge score.

6. The method of claim 5, wherein the edge score is computed as the sum of the absolute value of each of selected coefficients of the second type of each luminance block in that macroblock.

7. The method of claim 5, wherein step (d) comprises searching the macroblocks within the image to find a section with the highest total score.

8. The method of claim 7, wherein step (d) further comprises cropping out a portion of the image containing the section with the highest score.

9. The method of claim 4, wherein the first score is computed as the difference between the second and first average values multiplied by a preset constant.

10. A method for reducing an image to a given target size, comprising the steps of:
 (a) partitioning the image into a plurality of macroblocks, each macroblock containing a plurality of Cb chrominance blocks, a plurality of Cr chrominance blocks, and a plurality of luminance blocks, each block containing a DC coefficient and a plurality of AC coefficients;
 (b) for each macroblock, computing an average DC value of the Cb chrominance blocks (DCb), computing an average DC value of the Cr chrominance blocks (DCr), and assigning a first score indicating the presence of the particular type of texture in that macroblock, if (i) the absolute values of DCb and DCr are approximately the equal, (ii) DCr is greater than zero, (iii) DCb is less than zero, and (iv) DCr is less than a predetermined constant, the first score being computed based on DCb, DCr and a preset constant, and assigning a second score to each macroblock indicating the absence of the particular type of texture in that macroblock if all of the conditions (i) through (iv) are not satisfied;
 (c) for each macroblock, adding to the first score or second score an edge score computed based on the absolute values of selected AC coefficients of each luminance block in that macroblock; and
 (d) searching the macroblocks within the image to find a section with the highest total score and cropping out a portion of the image containing the section with the highest score.

11. An apparatus for reducing an image to a given target size, the apparatus comprising:
 means for partitioning the image into a plurality of macroblocks, each macroblock containing a plurality of chrominance and luminance blocks, each chrominance block and each luminance block containing a first type of coefficient and a plurality of second type of coefficients;
 means for applying a first rule to each macroblock based on values of the first type of coefficient of the chrominance blocks in that macroblock to identify a particular type of texture in the image;
 means for applying a second rule to each macroblock based on select values of the second type of coefficient of luminance blocks in that macroblock to identify edges in the image; and
 means for searching the macroblocks within the image to find an area containing an area of interest based on the results of applying the first and second rules.

12. The apparatus of claim 11, wherein the plurality of chrominance blocks in each macroblock comprises a plurality of Cb chrominance blocks and a plurality of Cr chrominance blocks.

13. The apparatus of claim 12, wherein the first rule applying means computes a first average value of the first type of coefficient of the Cb chrominance blocks and computes a second average value of the first type of coefficient of the Cr chrominance blocks.

14. The apparatus of claim 13, wherein the first rule applying means assigns a first score to each macroblock indicating the presence of the particular type of texture in that macroblock, if (i) the absolute values of the first and second average values are approximately equal, (ii) the first average value is less than zero, (iii) the second average value is greater than zero, and (iv) the second average value is less than a predetermined constant, and assigns a second score to each macroblock indicating the absence of the particular type of texture in that macroblock if all of the conditions (i) through (iv) are not satisfied.

15. The apparatus of claim 14, where the second rule applying means adds to the first or second score an edge score.

16. The apparatus of claim 15, wherein the edge score is computed as the sum of the absolute value of each of selected coefficients of the second type of each luminance block in that macroblock.

17. The apparatus of claim 15, wherein the searching means searches the macroblocks within the image to find a section with the highest total score.

18. The apparatus of claim 17, wherein the searching means crops out a portion of the image containing the section with the highest score.

19. The apparatus of claim 14, wherein the first score is computed as the difference between the second and first average values multiplied by a preset constant.

20. The apparatus of claim 11, wherein the apparatus comprises a computer.

21. The apparatus of claim 11, wherein the apparatus comprises a cell phone.

22. The apparatus of claim 11, wherein the apparatus comprises a personal digital assistant.

23. A machine-readable medium having a program of instructions for directing a machine to reduce an image to a given target size, the program of instructions comprising:
 (a) instructions for partitioning the image into a plurality of macroblocks, each macroblock containing a plurality of chrominance and luminance blocks, each chrominance block and each luminance block containing a first type of coefficient and a plurality of second type of coefficients;
 (b) instructions for applying to each macroblock a first rule based on values of the first type of coefficient of the chrominance blocks in that macroblock to identify a particular type of texture in the image;

(c) instructions for applying to each macroblock a second rule based on select values of the second type of coefficient of luminance blocks in that macroblock to identify edges in the image; and (d) instructions for searching the macroblocks within the image to find an area containing an area of interest based on the results of applying the first and second rules.

24. The machine-readable medium of claim 23, wherein the plurality of chrominance blocks in each macroblock comprises a plurality of Cb chrominance blocks and a plurality of Cr chrominance blocks.

25. The machine-readable medium of claim 24, wherein instructions (b) comprise instructions for computing a first average value of the first type of coefficient of the Cb chrominance blocks and computing a second average value of the first type of coefficient of the Cr chrominance blocks.

26. The machine-readable medium of claim 25, wherein instructions (b) further comprise instructions for assigning a first score to each macroblock indicating the presence of the particular type of texture in that macroblock, if (i) the absolute values of the first and second average values are approximately equal, (ii) the first average value is less than zero, (iii) the second average value is greater than zero, and (iv) the second average value is less than a predetermined constant, and assigning a second score to each macroblock indicating the absence of the particular type of texture in that macroblock if all of the conditions (i) through (iv) are not satisfied.

27. The machine-readable medium of claim 26, where instructions (c) comprise instructions for adding to the first or second score an edge score.

28. The machine-readable medium of claim 27, wherein the edge score is computed as the sum of the absolute value of each of selected coefficients of the second type of each luminance block in that macroblock.

29. The machine-readable medium of claim 26, wherein the first score is computed as the difference between the second and first average values multiplied by a preset constant.

30. The machine-readable medium of claim 27, wherein instructions (d) comprise instructions for searching the macroblocks within the image to find a section with the highest total score.

31. The machine-readable medium of claim 30, wherein instructions (d) further comprise instructions for cropping out a portion of the image containing the section with the highest score.

32. A machine-readable medium having a program of instructions for directing a machine to reduce an image to a given target size, the program of instructions comprising:

(a) instructions for partitioning the image into a plurality of macroblocks, each macroblock containing a plurality of Cb chrominance blocks, a plurality of Cr chrominance blocks, and a plurality of luminance blocks, each block containing a DC coefficient and a plurality of AC coefficients;

(b) instructions for computing, for each macroblock, an average DC value of the Cb chrominance blocks (DCb), computing an average DC value of the Cr chrominance blocks (DCr), and assigning a first score indicating the presence of the particular type of texture in that macroblock, if (i) the absolute values of DCb and DCr are approximately the equal, (ii) DCr is greater than zero, (iii) DCb is less than zero, and (iv) DCr is less than a predetermined constant, the first score being computed based on DCb, DCr and a preset constant, and assigning a second score to each macroblock indicating the absence of the particular type of texture in that macroblock if all of the conditions (i) through (iv) are not satisfied;

(c) instructions for adding to the first score or second score, for each macroblock, an edge score computed based on the absolute values of selected AC coefficients of each luminance block in that macroblock; and (d) instructions for searching the macroblocks within the image to find a section with the highest total score and cropping out a portion of the image containing the section with the highest score.

\* \* \* \* \*